(12) United States Patent
Sashida

(10) Patent No.: US 6,788,440 B1
(45) Date of Patent: Sep. 7, 2004

(54) SHEET FEEDING DEVICE, SHEET TREATING DEVICE AND IMAGE READING APPARATUS USING THE SAME

(75) Inventor: Minoru Sashida, Chichibu (JP)

(73) Assignee: Canon Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,135

(22) Filed: Apr. 6, 2000

(30) Foreign Application Priority Data

Apr. 8, 1999 (JP) .......................................... 11-100992

(51) Int. Cl.$^7$ ................................................ H04N 1/04
(52) U.S. Cl. .................... 358/498; 358/497; 271/10.12; 271/10.03; 271/122
(58) Field of Search ................................ 358/498, 497, 358/496, 504, 509; 271/10.12, 10.03, 10.11, 122, 125

(56) References Cited

U.S. PATENT DOCUMENTS

| | | | | |
|---|---|---|---|---|
| 4,208,046 A | * | 6/1980 | Shimizu ..................... | 271/122 |
| 5,125,636 A | * | 6/1992 | Higashio ..................... | 271/9 |
| 5,648,843 A | * | 7/1997 | Eguchi ..................... | 399/364 |
| 5,678,817 A | * | 10/1997 | Saito et al. ................. | 271/122 |
| 6,168,146 B1 | * | 1/2001 | Komuro et al. .......... | 271/10.12 |
| 6,375,183 B1 | * | 4/2002 | Inoue et al. ............. | 271/10.11 |

* cited by examiner

Primary Examiner—Kimberly Williams
Assistant Examiner—Negussie Worku
(74) Attorney, Agent, or Firm—Fitzpatrick, Cella, Harper & Scinto

(57) ABSTRACT

In a sheet feeding device having a forwardly rotating conveying rotary member and a reversely rotating separating rotary member, and for separating and conveying sheets one by one by a sheet separating portion comprised of these two rotary members, the setting of an appropriate center distance when a sheet is separated and conveyed with the center distance between the conveying rotary member and the separating rotary member fixed is effected smoothly within a short time, and a first sheet feeding mode for effecting sheet feeding while automatically adjusting the center distance for each sheet by a center distance changing device and a controller and a second sheet feeding mode for effecting sheet feeding with the center distance fixed can be arbitrarily selected, and when the setting of the center distance during the selection of the second sheet feeding mode is to be effected, the execution of the center distance setting standard operation (adjusting operation) of detecting the center distance automatically adjusted when one or any plurality of sheets are fed in the first sheet feeding mode, and displaying the set value of the center distance based on the result of the detection on a displaying portion is possible.

8 Claims, 5 Drawing Sheets

SHEET FEEDING DEVICE, SHEET TREATING DEVICE AND IMAGE READING APPARATUS USING THE SAME

BACKGROUND OF THE INVENTION

1. Field of the Invention

This invention relates to a sheet feeding device for separating and conveying a sheet (a sheet-shaped substance or a sheet material) typified by paper, a sheet treating device provided with the sheet feeding device, and an image reading apparatus provided with the sheet feeding device.

2. Related Background Art

For the sake of convenience, description will hereinafter be made of an example of an image reading apparatus for reading an image recorded on a sheet-shaped original by a close sensor or the like, and delivering the read image data or recording the read image data on a recording medium.

This image reading apparatus has an original stacking portion stacking originals thereon and moving them to an original introducing position, and this original stacking portion is controlled so as to position the level of the uppermost one of the originals stacked thereon within a predetermined range relative to the original introducing port of the image reading apparatus.

a) The original stacking portion is moved so that the originals may be located at a prescribed level, whereafter the uppermost one of the originals with which a pickup roller is in contact is fed to, or in case that the uppermost original and an original just beneath the uppermost original are carried away by the friction between the originals, a plurality of originals are fed to a sheet separating portion (a contact portion or a nip portion) formed by a feed roller as a forwardly rotating conveying rotary member and a separating roller as a reversely rotating separating rotary member, by the pickup roller.

The sheet separating portion formed by the feed roller and the separating roller has the center distance between the feed roller and the separating roller set to a state in which in the initial state, the passage of any original is not permitted.

b) The change of the center distance by the relative movement of the feed roller and the separating roller is started by a first detection signal from first detecting means for detecting that the leading end of an original has come to just the front of the sheet separating portion.

That is, the feed roller and the separating roller has the center distance therebetween widened relatively by center distance changing means having a motor or the like as a drive source, and when they have come to assume such a positional relation that only the uppermost one of the originals can pass, that original passes through the sheet separating portion.

c) The operation of widening the center distance is stopped by a second detection signal from second detecting means disposed just after the separating portion for detecting that the leading end of the original has passed through the separating portion.

d) When it is detected by the second detecting means that the trailing end of the original has passed through the sheet separating portion, the feed roller and the separating roller are driven so as to restore the center distance therebetween to its initial state.

The apparatus operation described under items a) to d) above is the operation of automatically adjusting the center distance between the feed roller and the separating roller for the separation of a sheet, and this operation cycle is repetitively executed each time an original is fed.

By this center distance automatic adjusting operation method, the sheet separating portion starts the sheet separating and conveying operation from the initial state without fail and therefore, originals of any thickness are conveyed one by one in the apparatus.

After the original has passed through the sheet separating portion, it passes through an image reading portion by a conveying roller, a conveying belt or the like disposed as required, and is discharged from a discharge port.

In an image reading apparatus having a sheet feeding portion having no mechanism for automatically adjusting the center distance between the feed roller and the separating roller for each original as described above, sheet feeding was effected with the center distance between the feed roller and the separating roller manually and mechanically adjusted and fixed in accordance with the size, thickness, paper quality, etc. of the original being conveyed.

Even when in the above-described example of the conventional art, there is provided a sheet feeding device capable of performing the sheet feeding operation while automatically adjusting the center distance between the feed roller and the separating roller for each original, if the size, thickness and paper quality of the originals being conveyed are uniform or can be regarded as being substantially uniform in the bundle of originals, it can omit the operation of operating the relative center distance in the widening direction from the initial state for each original, and narrowing it back to the initial state and the performance of the apparatus may heighten (the number of originals treated per unit time is increased by the sheet-to-sheet distance being shortened) if the sheet feeding operation is performed with the center distance between the feed roller and the separating roller fixed.

In that case, it becomes necessary to manually appropriately adjust the center distance in accordance with the original being conveyed, and this adjustment was done in the following procedure.

1. The center distance is set at a position whereat bad separation or the like will not occur to the originals being conveyed.

2. An attempt is made to actually convey several originals.

3. Actual conveyance is effected if conveyance is good.

4. When bad separation or the like occurs, the set value of the center distance is corrected.

5. An attempt is again made to convey several originals.

6. The work mentioned under items 4 and 5 is repetitively done until good conveyance is effected.

This adjustment is requisite in an apparatus having no mechanism for automatically adjusting the center distance, and even in an apparatus having the mechanism for automatically adjusting the center distance, it is necessary to carry out this adjustment whenever the conveyance of originals with the center distance fixed is effected, and much time was required until a set value of the center distance corresponding to the kind of the original was found out.

Also, when the set value was to be found out for an original actually conveyed, the original was stained or damaged in some cases.

SUMMARY OF THE INVENTION

So, the present invention has as its object to enable, in the sheet feeding device as described above, or an image reading apparatus or other sheet treating apparatus provided with the sheet feeding device, the setting of an appropriate center distance when a sheet is separated and conveyed with the center distance between the conveying rotary member and the separating rotary member constituting the sheet separating portion to be smoothly effected within a short time.

The present invention provides the following sheet feeding device, sheet treating device and image forming apparatus.

(1) A sheet feeding device which has a sheet separating portion for separating and conveying sheets one by one by a forwardly rotating conveying rotary member and a reversely rotating separating rotary member, center distance changing means capable of relatively changing the center distance between the conveying rotary member and the separating rotary member, control means for controlling the center distance changing means, an operating portion capable of arbitrarily setting the center distance, and a displaying portion for displaying the set value of the center distance set by the operating portion, and has selecting means capable of arbitrarily selecting a first sheet feeding mode for effecting sheet feeding while automatically adjusting the center distance by the center distance changing means and the control means for each sheet, and a second sheet feeding mode in which during the sheet feeding operation, the control means effects sheet feeding with the center distance fixed at the set value displayed on the displaying portion.

(2) The selecting means comprises a first switch capable of arbitrarily selecting the first sheet feeding mode and the second sheet feeding mode, and a second switch for switching the propriety of a center distance setting input for effecting the setting of the center distance when the second sheet feeding mode is selected.

(3) A sheet feeding device according to item (1) or (2), wherein an adjusting input is possible to the set value of the center distance displayed on the displaying portion.

(4) A sheet feeding device according to any one of items (1) to (3), having memory means for storing the set value of the center distance therein, and wherein unless the set value of the center distance is changed, when the second sheet feeding mode is selected, the second sheet feeding mode is executed at the set value of the center distance stored in the memory means.

(5) A sheet treating device having a sheet feeding device according to any one of items (1) to (4), and a treating portion for the sheets fed from the sheet feeding device.

(6) A sheet treating device according to item (5), wherein the treating portion for the sheets is a reading portion, a printing portion, a copying portion, an assorting portion, an applying portion, a heating portion, a cutting portion or a punching portion, or a compound treating portion thereof.

(7) An image reading apparatus having:
  a separating portion for separating and conveying sheet-shaped originals one by one by a forwardly rotating conveying rotary member and a reversely rotating separating rotary member;
  center distance changing means capable of relatively changing the center distance between the conveying rotary member and the separating rotary member;
  control means for controlling the center distance changing means;
  adjusting means for adjusting the brightness of a read image;
  display means for displaying the adjusted value of the brightness of the read image;
  a first switch capable of arbitrarily selecting a first sheet feeding mode for effecting sheet feeding while automatically adjusting the center distance for each original, and a second sheet feeding mode for effecting sheet feeding with the center distance fixed; and
  a second switch for switching the propriety of a center distance setting input for effecting the setting of the center distance when the second sheet feeding mode is selected;
  wherein when the center distance setting input is made possible by the second switch, the setting of the center distance is effected by the adjusting means for adjusting the brightness of the read image, and the set value of the center distance is displayed by the display means for displaying the brightness of the read image.

(8) An image reading apparatus according to item (7), wherein an adjusting input is possible to the set value of the center distance displayed by the display means.

(9) An image reading apparatus according to item (7) or (8), having memory means for storing the set value of the center distance therein, and wherein unless the set value of the center distance is newly inputted, when the second sheet feeding mode is selected, the second sheet feeding mode is executed at the set value of the center distance stored in the memory means.

That is, when the setting of the center distance during the selection of the second sheet feeding mode for effecting sheet feeding with the center distance between the conveying rotary member and the separating rotary member fixed is to be effected, the center distance setting standard operation (hereinafter referred to as the adjusting operation) of detecting the center distance automatically adjusted when a sheet or any plurality of sheets have been fed in the first sheet feeding mode for effecting sheet feeding with the center distance automatically adjusted for each sheet (original) and displaying the set value of the center distance based on the result of the detection on the display portion is performed, whereby the set value of an appropriate center distance can be easily known by the display portion and thereby, it becomes possible to smoothly effect the setting of the center distance in the case of the second sheet feeding mode for effecting the separation and conveyance of a sheet with the center distance between the conveying rotary member and the separating rotary member of the sheet separating portion fixed within a short time.

Also, the above-described adjusting operation is made executable only when the center distance set value input mode is brought about, whereby the set value of the center distance can be obviated from being inadvertently changed.

By permitting the adjusting input to the set value of the center distance obtained in the adjusting operation, the error of the apparatus is made correctable, and the more reliable separation and conveyance of a sheet in the second sheet feeding mode can be made possible.

Design is made such that the set value of the center distance obtained in the adjusting operation is stored in the memory means and during the selection of the second sheet feeding mode, conveyance is effected in the second sheet feeding mode by the use of this stored set value, whereby when a sheet separated and conveyed in the second sheet feeding mode is of a fixed size, thickness and paper quality, it has become possible to effect the conveyance of the sheet immediately with the adjustment omitted.

In the image reading apparatus, the center distance set value input is used in both the operating portion and the display portion in common with an operating portion and a display portion of other functions, whereby an image reading apparatus which can perform the adjusting operation can be provided without greatly increasing the display portions and operating keys.

Also, by using a center distance setting input key and a set value displaying portion in common with other functions, and yet permitting the adjusting input to the set value of the center distance obtained in the adjusting operation, the error of the apparatus can be made correctable, and an image reading apparatus which can effect the more reliable separation and conveyance of an original in the second sheet feeding mode.

Further, design is made such that the center distance setting input is used in the operating portion and the display portion in common with other functions, and yet the set value of the center distance obtained in the adjusting operation is stored in the memory means and during the selection of the second sheet feeding mode, conveyance is effected in the second sheet feeding mode by the use of this stored set value, whereby there can be provided an image reading apparatus which can effect the conveyance of an original immediately with the adjustment omitted when the original conveyed in the second sheet feeding mode is of a fixed size, thickness and paper quality.

DESCRIPTION OF THE PREFERRED EMBODIMENTS

<First Embodiment> (FIGS. 1 to 4)

Figure 1:
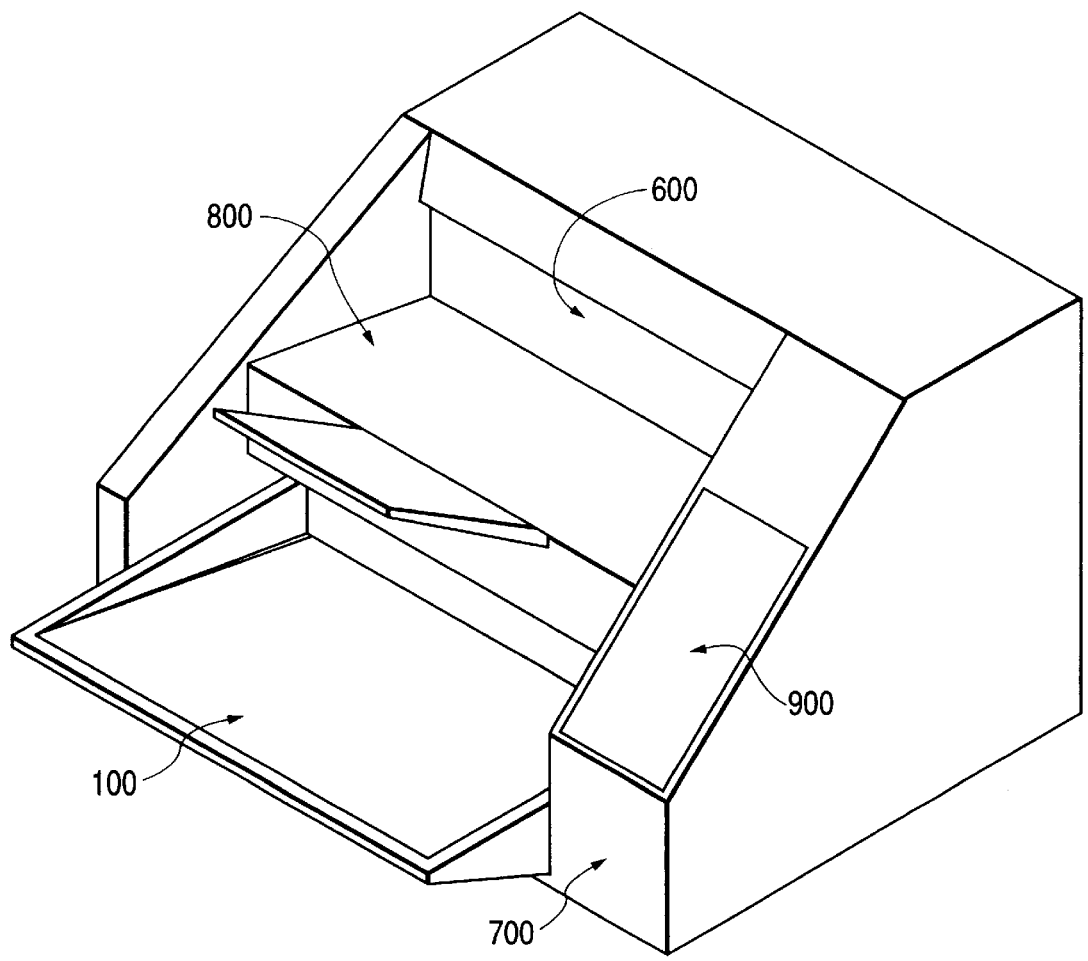
FIG. 1 is a pictorial perspective view of an image reading apparatus according to a first embodiment of the present invention.

FIG. 1 is a pictorial perspective view of an image reading apparatus to which the present invention is applied. In FIG. 1, the reference numeral 100 designates an original stacking portion, the reference numeral 600 denotes a sheet discharging portion, the reference numeral 700 designates a lower unit, the reference numeral 800 denotes an upper unit, and the reference numeral 900 designates an operating portion.

Figure 2:
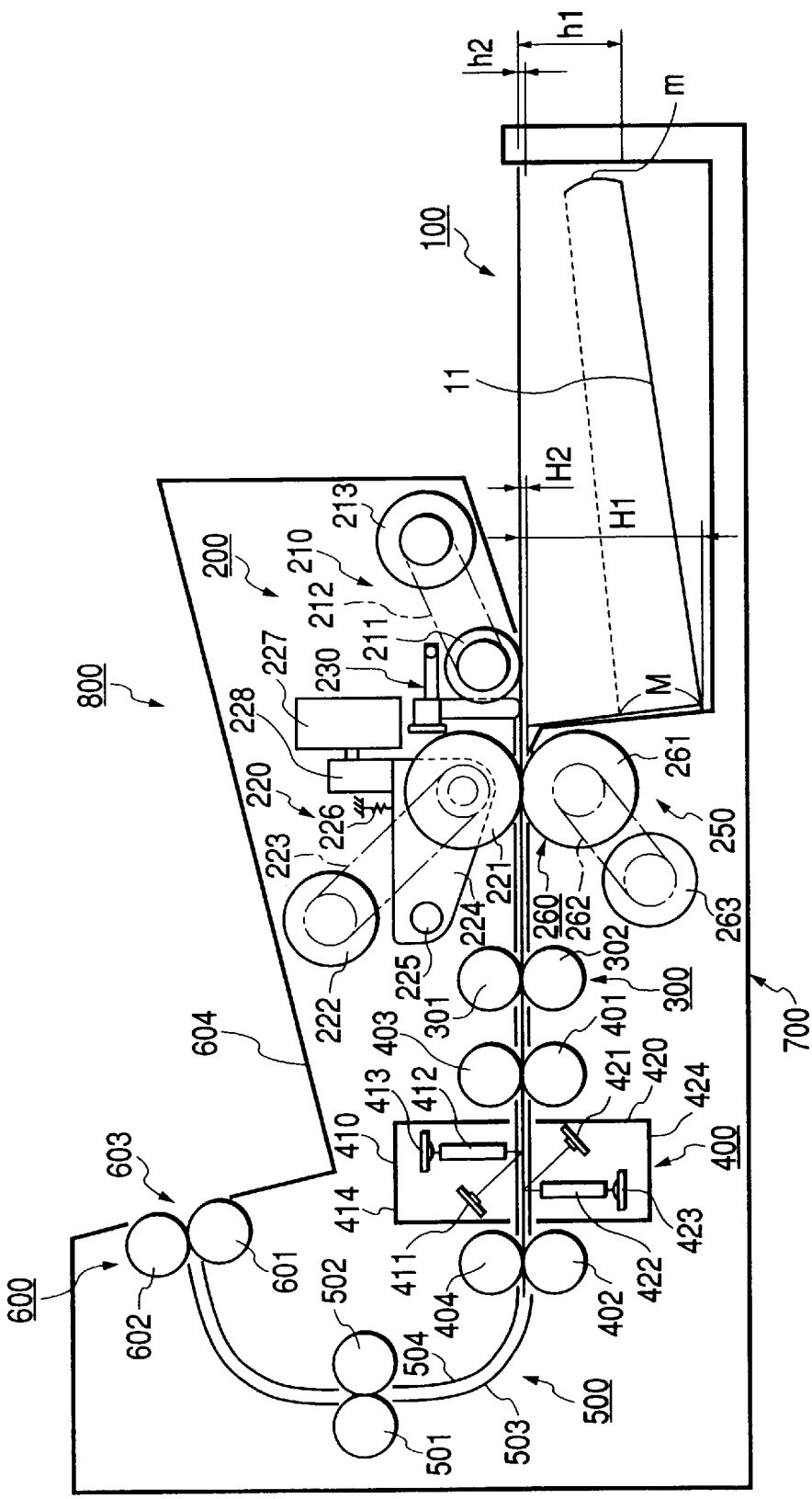
FIG. 2 is a cross-sectional model view showing an internal construction of the apparatus of FIG. 1.

FIG. 2 is a cross-sectional model view of this image reading apparatus, and the conveyance of originals (sheet-shaped originals) stacked on the original stacking portion 100 will hereinafter be described with reference to FIG. 2.

(1) Original Stacking Portion 100

The reference numeral 11 denotes a vertically movable original stacking table on which the sheet-shaped originals are stacked. When the distances of an original stacking portion conveying path entrance side end portion and the opposite side end portion thereof when the original stacking table 11 on which a plurality of sheet-shaped originals are stacked is in its lowest position from the horizontal extension of the level of an original entrance are defined HI and hi, respectively, and the distances thereof when the original stacking table 11 is in its uppermost position are defined as H2 and h2, respectively, and the amounts of movement thereof from their respective operation start are defined as M and m, respectively, the operation of the original stacking table is designed to satisfy the relations that $H1 > h1, H2 \geq h2$ and $M \geq m$.

(2) Sheet Feeding Portion 200

The reference numeral 200 designates a sheet feeding portion. It is comprised of a pickup portion 210 and a separating and conveying portion 250 comprising a feed roller unit 220 and a separating unit 260.

In the pickup portion 210, the reference numeral 211 denotes a pickup roller (feeding rotary member) for feeding the original from an original introducing port to the separating portion, and the drive from a motor 213 is transmitted to the pickup roller 211 by a belt 212.

The reference numeral 230 designates detecting means comprising a lever and a sensor for detecting the height of the originals, and it contacts with the uppermost one of the originals stacked on the original stacking table 11 of the original stacking portion 100 and the operation of the original stacking table 11 is controlled so as to make the position of the detecting means constant.

The separating and conveying portion 250 is designed to separate and convey an original or only the uppermost one of a plurality of originals fed to a sheet separating portion (a contact portion or a nip portion) comprised of a feed roller 221 as the conveying rotary member of the feed roller unit 220 and a separating roller 261 as the separating rotary member of the separating unit 260 by the pickup roller 211, by the sheet separating portion.

The feed roller 221 and the separating roller 261 are, for example, of a pectinate shape and roller portions exist alternately.

The feed roller unit 220 comprises a frame 224 pivotally movable about a shaft 225, a feed roller 221 rotatably journalled to and held by this pivotally movable frame 224, a motor 222 for forwardly driving this feed roller 221 in an original conveying direction, a belt 223 connecting the feed roller 221 and the motor 222 together, a spring 226 normally pivotally biasing the pivotally movable frame 224 in an upward direction about the shaft 225, a cam 228 abutting against the upper surface of the pivotally movable frame 224, and a stepping motor 227 for rotating this cam 228.

The frame 224 by which the feed roller 221 is held is pivotally moved about the shaft 225 by the spring 226 and the cam 228 rotated by the stepping motor 227, whereby the center distance of the feed roller 221 with respect to the separating roller 261 on the separating unit 260 side can be widened and narrowed.

The separating roller 261 of the separating unit 260 is connected to a motor 263 by a belt 262, and is reversely driven in the opposite direction from the feed roller 221 (an original returning direction).

(3) Registration Portion 300

The reference numeral 300 denotes a registration portion. The reference numeral 301 designates an upper registration roller, and the reference numeral 302 denotes a lower registration roller, and these are connected together by a gear, not shown.

The pair of registration rollers 301 and 302 have their connection and non-connection controlled by a clutch, not shown, to the drive from a main motor, not shown, and control the conveyance of an original separated and conveyed from the separating and conveying portion 250 to a reading portion 400.

(4) Reading Portion 400

The reference numeral 400 designates a reading portion. The reference numeral 410 denotes an upper reading unit in which an LED array 411 which is an illuminating light source, an imaging lens array 412 and an image reading close sensor 413 are contained in a casing 414.

The reference numeral 420 denotes a lower reading unit in which an LED array 421 which is an illuminating light source, an imaging lens array 422 and an image reading close sensor 423 are contained in a casing 424.

The reference numerals 401 and 402 designate reading guide rollers to which the drive from the main motor is transmitted by drive transmitting means such as a belt, not shown. The reference numerals 403 and 404 denote driven rollers forming pairs with the above-described reading guide rollers 401 and 402, respectively.

An original is conveyed between the upper reading unit 410 and the lower reading unit 420, whereby the reading of the image information on the upper surface side or/and the lower surface side of the conveyed original is done. The image information thus read is sent to an image processing portion (such as a recording portion, a displaying portion, a preserving portion, a memory portion, a transmitting portion or a copying portion), not shown.

(5) Conveying Portion 500

The reference numeral 500 designates a conveying portion. The reference numeral 501 denotes a conveying roller to which the drive from the main motor is connected. The reference numeral 502 designates a driven roller opposed to the conveying roller 501. The reference numerals 503 and 504 denote conveying guides for guiding the original which has passed through the reading portion 400.

(6) Sheet Discharging Portion 600

In the sheet discharging portion 600, the reference numerals 601 and 602 designate a sheet discharging roller and the driven roller thereof. The original passed through the conveying portion 500 is discharged from a sheet discharge port 603 onto a sheet discharge tray 604 by the sheet discharging roller 601 and the driven roller 602 thereof. Also, in the sheet discharging portion 600, there are provided a plurality of elastic members, not shown, for preventing the direction of conveyance from rounding off and securing the line-up property of discharged sheets in such a manner as to wave the original in a direction orthogonal to the direction of conveyance during the passage of the original.

(7) Lower Unit 700

In the lower unit 700 of the apparatus, there are disposed the original stacking portion 100, the separating roller unit 260, the registration portion 300, the reading guide rollers 401, 402, the lower reading unit 420, the conveying roller 501, the conveying guide 503 and the sheet discharging portion 600.

(8) Upper unit 800

In the upper unit 800, there are contained the pickup portion 210, the feed roller unit 220, the reading driven rollers 403, 404, the upper reading unit 410, the conveying driven roller 502, the conveying guide 504, etc.

This upper unit 800 is disposed on the same shaft as the sheet discharging roller 601 openably and closably relative to the lower unit 700.

(9) Operating Portion 900

Figure 3:
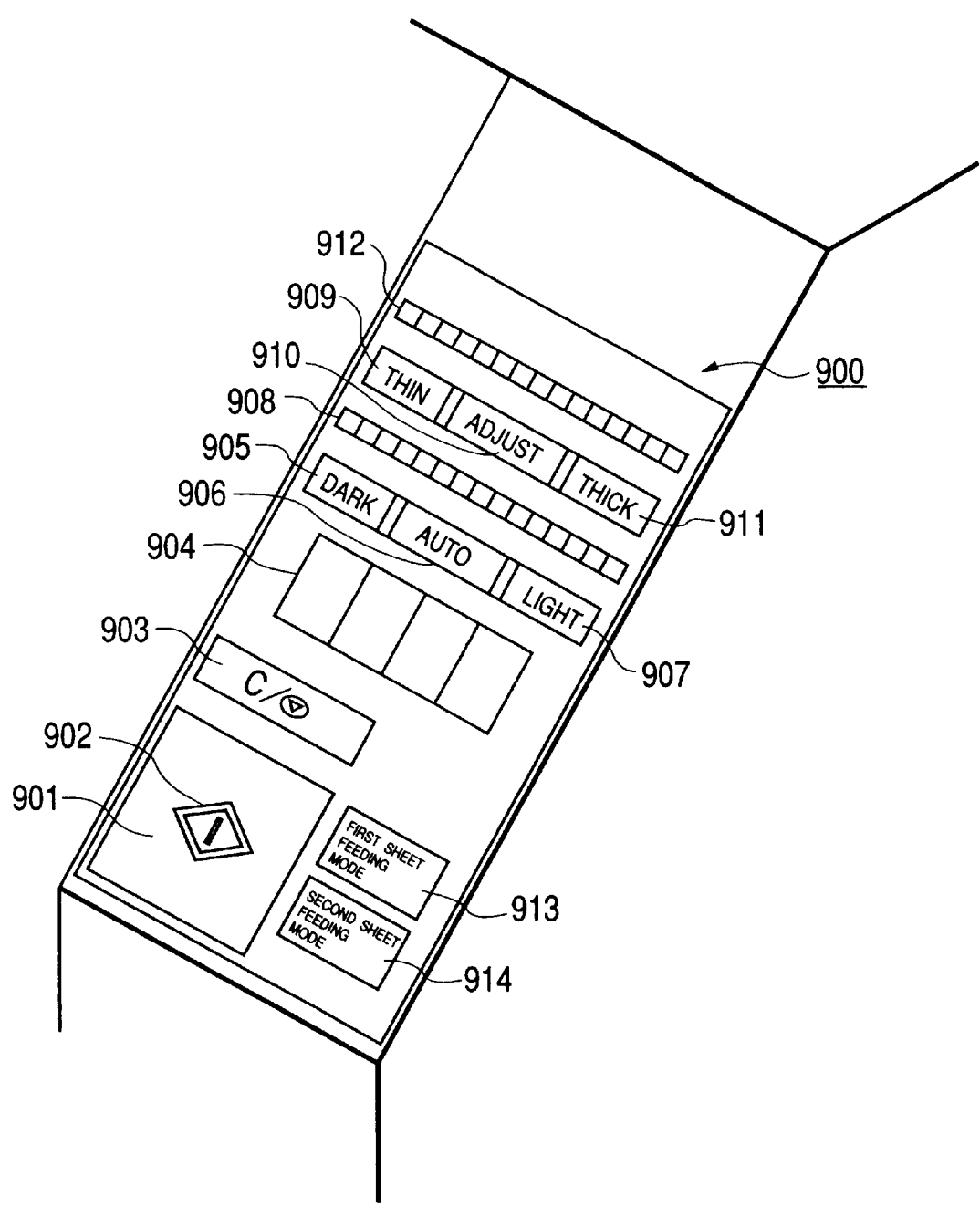
FIG. 3 is a perspective view of an operating portion of the apparatus of FIG. 1.

FIG. 3 is a perspective view of the operating portion 900.

The reference numeral 901 denotes a start key for instructing to start the conveyance of the original, and the reference numeral 902 designates an indicator provided on this start key for indicating whether the conveyance of the original is possible.

The reference numeral 903 denotes a stop key for instructing to stop the conveyance of the original, and the reference numeral 904 designates a counter for displaying the number of conveyed originals.

The reference numerals 905 and 907 denote manual keys for adjusting the brightness of the reading of an image. The key 905 operates so as to darken the read image, and the key 907 operates so as to lighten the read image. The reference numeral 906 designates a key for directing a mode for automatically adjusting the brightness.

The reference numeral 908 denotes a displaying portion for displaying the set value of the brightness of the read image adjusted by the keys 905 and 907, and the display is moved by the operation of the keys 905 and 907. When the mode for automatically adjusting the brightness is directed by the key 906, the display is not effected.

The reference numerals 909 and 911 designate keys for adjusting the center distance between the feed roller 221 and the separating roller 261 in the case of a second sheet feeding mode for separating and conveying an original with the center distance fixed, and the key 909 instructs to decrease the center distance, and the key 911 instructs to increase the center distance. The reference numeral 912 denotes a displaying portion for effecting display conforming to the operation of these center distance adjusting keys 909 and 911.

The reference numeral 910 designates an adjust key, and when this key 910 is depressed, the center distance adjusting keys 909 and 911 become effective, and the setting input of the center distance between the feed roller 221 and the separating roller 261 becomes possible.

The reference numeral 913 denotes a key for selecting a first sheet feeding mode for automatically adjusting the center distance for each original, and the reference numeral 914 designates a key for selecting the second sheet feeding mode for conveying the original with the center distance fixed at the set value.

(10) First Sheet Feeding Mode and Second Sheet Feeding Mode

Figure 4:
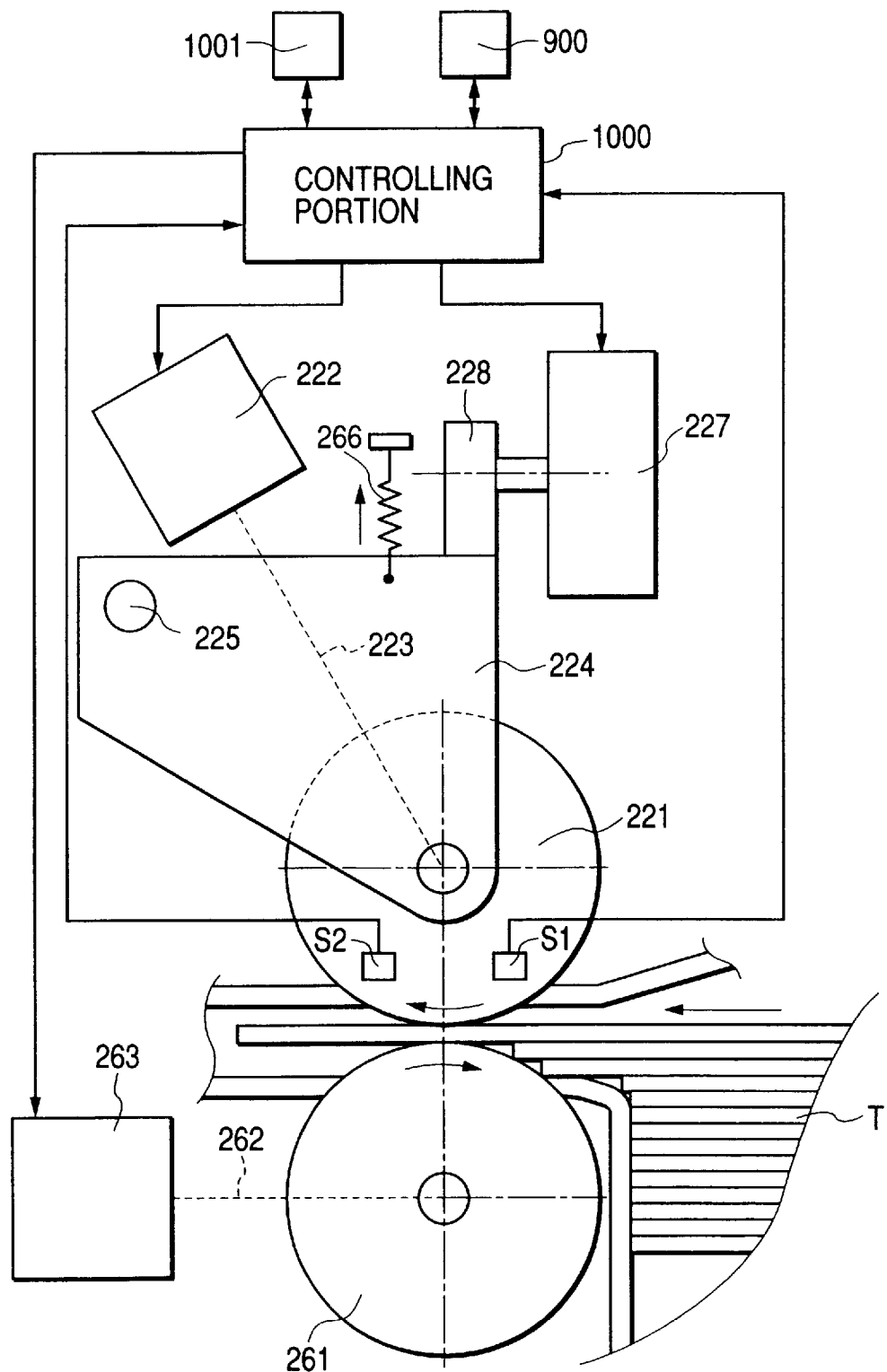
FIG. 4 is a block diagram of a control system of a separating and conveying portion of the image reading apparatus.

FIG. 4 is a block diagram showing the concept of the control of the separating and conveying portion 250.

a) First Sheet Feeding Mode

Description will first be made of the operation of the first sheet feeding mode in which the center distance between the feed roller 221 and the separating roller 261 is automatically adjusted.

When in the operating portion 900, the first sheet feeding mode is selected by the sheet feeding mode selecting key 913 and thereafter, the starting of the conveyance of the original is directed by the key 901, the feed roller 221, the separating roller 261 and the conveying rollers by the main motor, not shown, start to operate.

Thereafter, when the uppermost original of the bundle of originals T with which the pickup roller 211 is in contact, or together with an original just beneath the uppermost original is carried away by the friction between the originals, a plurality of originals are fed to the sheet separating portion formed by the feed roller 221 and the separating roller 261, by the pickup roller 211.

The sheet separating portion comprising the forwardly rotating feed roller 221 and the reversely rotating separating roller 261 has the center distance between the feed roller 221 and the separating roller 261 set to a state in which in the initial state, the passage of any original is not permitted.

The relative movement of the center distance between the feed roller 221 and the separating roller 261 is started by an original detection signal from a first sensor SI which detects that the leading end of the original has come to just the front of the sheet separating portion.

When the first sensor S1 detects the leading end of the original, a controlling portion 1000 drives the stepping motor 227 to thereby rotate the cam 228 in a direction to relatively gradually widen the center distance between the feed roller 221 and the separating roller 261.

When the center distance between the feed roller 221 and the separating roller 261 has become such a distance that only the uppermost original of the bundle of originals T can pass, that original passes through the sheet separating portion.

S2 designates a second sensor for detecting that the leading end of the original has passed through the sheet separating portion, and the second sensor S2 is disposed immediately after the sheet separating portion, and by an original leading end detection signal from this second sensor S2, the controlling portion 1000 stops the movement of the stepping motor 227. That is, it stops the rotation of the cam 228, and causes the center distance at the point of time of the stoppage to be held.

Thereby, only the uppermost original of the bundle of originals T is conveyed by the forwardly rotating force of the feed roller 221, and the subsequent originals double-fed along therewith are prevented from being conveyed by the above-mentioned held center distance and the push-back force by the reverse rotation of the separating roller 261. That is, the reliable separation and conveyance of an original are done.

When the second sensor S2 detects that the trailing end of the conveyed original has passed through the sheet separating portion, the controlling portion 1000 reversely drives the stepping motor 227 to thereby rotate the cam 228 in a direction to narrow the center distance between the feed roller 221 and the separating roller 261 back to the initial state.

In this center distance automatic adjusting method, the sheet separating portion causes the operation of widening the center distance from the initial state in which any original is not passed and stopping the operation of widening the center distance when the center distance has become a center distance enough to pass only the uppermost original to be executed for each original and therefore, even if originals of different thicknesses are mixedly stacked on the original stacking portion, the originals are conveyed one by one in the apparatus.

b) Second Sheet Feeding Mode

Description will now be made of the second sheet feeding mode for conveying the original with the center distance between the feed roller 221 and the separating roller 261 fixed at the set value.

When the adjust key 910 is depressed even if the image reading apparatus is in any of the first sheet feeding mode and the second sheet feeding mode, the image reading apparatus assumes a center distance set value input mode, and the set value stored in a memory means 1001 in the controlling portion 1000 is displayed on the displaying portion 912.

At this time, the center distance set value input keys 909 and 911 become effective, and in conformity with the operation of these keys 909 and 911, the set value displayed on the displaying portion 912 becomes changeable.

When the set value can be determined by the center distance set value input keys 909 and 911, the setting is intactly inputted, and the adjust key 910 is depressed once more to thereby terminate the center distance set value input mode.

If the set value is unclear, when in the state of the center distance set value input mode, the start key 901 is depressed leaving only an original to be conveyed to the original stacking portion 100, sheet feeding is done in the first sheet feeding mode in which the center distance is automatically adjusted, and the adjusting operation (the center distance setting standard operation) of detecting the center distance for which the then original has passed, and displaying a set value corresponding thereto on the displaying portion 912 is executed.

In the present embodiment, the total driving pulse of the stepping motor 227 when the passage of the original has been detected is adopted as a numerical value corresponding to the center distance.

Here, the adjust key 910 can be depressed to thereby terminate the center distance set value input mode, and adjustment may be applied to the set value by the center distance set value input keys 909 and 911.

The set value determined by this center distance set value input mode is stored in the memory means 1001 of the controlling portion 1000.

When the second sheet feeding mode is selected by the selecting key 914 and the conveyance of the original is directed by the start key 901, the controlling portion 1000 drives the stepping motor 227 so that the center distance may become the set value of the center distance stored in the memory means 1001, and the conveyance of the original is started after the center distance has been fixed at the set value.

Figure 5:
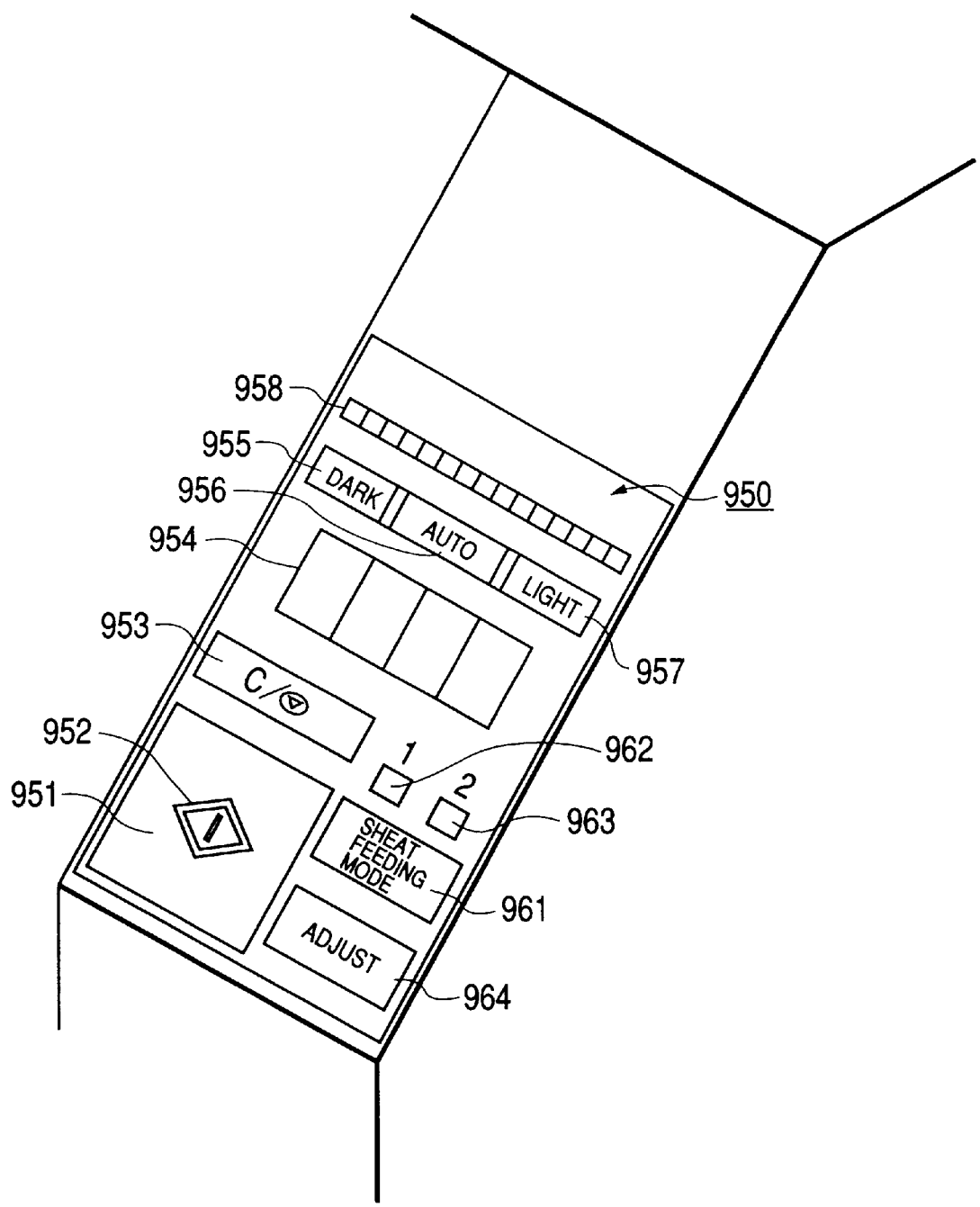
FIG. 5 is a perspective view of an operating portion of an image reading apparatus according to a second embodiment of the present invention.

<Second Embodiment> (FIG. 5)

FIG. 5 shows a perspective view of the operating portion 950 which is a second embodiment of the image reading apparatus to which the present invention is applied.

The basic apparatus structure and operation in the present embodiment are the same as those of the image reading apparatus according to the first embodiment and therefore need not be described again.

The reference numeral 951 designates a start key for directing the starting of the conveyance of an original, and the reference numeral 952 denotes an indicator provided on this start key for indicating whether the conveyance of the original is possible.

The reference numeral 953 designates a stop key for directing the stoppage of the conveyance of the original, and the reference numeral 954 denotes a counter for displaying the number of originals conveyed.

The reference numerals 955 and 957 designate manual keys for adjusting the brightness of the reading of an image, and the key 955 operates so as to darken the read image, and the key 957 operates so as to lighten the read image. The reference numeral 956 denotes a key for directing a mode for automatically adjusting the brightness.

The reference numeral 958 designates a displaying portion for displaying the set value of the brightness of the read image adjusted by the keys 955 and 957, and the display is moved by the operation of the keys 955 and 957. The display is not effected when a mode for automatically adjusting the brightness is directed by the key 956.

The manual keys 955 and 957 also function as keys for inputting the set value of the center distance in the case of the second sheet feeding mode in which the original is conveyed with the center distance between the feed roller 211 and the separating roller 261 fixed when an adjust key 964 is depressed to bring about the center distance set value input mode, and the key 955 is a combination key for instructing to decrease the center distance, and the key 957 is a combination key for instructing to increase the center distance.

Also, in the center distance set value input mode, the displaying portion 958 effects display differing from flicker display or reversal display showing the brightness of reading, and can effect the display of the set value correspondingly to the operation of the keys 955 and 957 and at the same time, displays that the mode is the center distance set value input mode.

The reference numeral 961 denotes a sheet feeding mode selecting key, and more particularly a selecting key for selecting a first sheet feeding mode for automatically adjusting the center distance for each original, and a second sheet feeding mode for conveying the original with the center distance fixed at the set value. When the first sheet feeding mode is selected, it is displayed by a displaying portion 962, and when the second sheet feeding mode is selected, it is displayed by a displaying portion 963.

In the present embodiment, the operation and display differ from those in the first embodiment with respect only to the second sheet feeding mode for conveying the original with the center distance between the feed roller 221 and the separating roller 261 fixed at the set value.

That is, even if the image reading apparatus is in any of the first sheet feeding mode and the second sheet feeding mode, when the adjust key 964 is depressed, the image reading apparatus assumes the center distance set value input mode. In this state, the keys 955 and 957 for adjusting the brightness of reading become center distance set value input keys, and in conformity with the operation of these keys 955 and 957, the set value is displayed on the displaying portion 958. At this time, the displaying portion 958 effects display by a displaying method such as flicker or reversal display differing from a state in which it displays the brightness of reading, and at the same time, also displays that the apparatus is in the center distance set value input mode.

When the set value of the center distance can be determined by the keys 955 and 957, the set value is intactly inputted and the adjust key 964 is depressed once more to thereby terminate the center distance set value input mode.

When the set value is unclear, when in the state of the center distance set value input mode, the start key 951 is depressed leaving only a single original to be conveyed on the original stacking portion 100, sheet feeding is effected in the first sheet feeding mode for automatically adjusting the center distance, and the adjusting operation of detecting the center distance for which the original has passed, and displaying the set value corresponding thereto on the displaying portion 958 is executed.

In the present embodiment, the total driving pulse of the stepping motor 227 when the passage of the original has been detected is adopted as a numerical value corresponding to the center distance.

Here, the adjust key 964 can be depressed to thereby terminate the center distance set value input mode, and adjustment may be applied to the set value by the keys 955 and 957.

The set value determined by this center distance set value input mode is stored in the memory device 1001 of the controlling portion 1000.

When the second sheet feeding mode is selected by the selecting key 961 and the conveyance of the original is directed by the start key 951, the controlling means 1000 drives the stepping motor 227 so that the center distance may become the set value of the center distance stored in the memory means 1001, and the conveyance of the original is started after the center distance has been fixed at the set value.

Other Embodiments

1) While in each of the above-described embodiments, only a single original is conveyed during the adjusting operation (the center distance setting standard operation) in the second sheet feeding mode to thereby effect the detection of the center distance and determine the set value of the center distance, a plurality of originals may be conveyed to thereby determine the set value on the basis of the average value of the respective center distances.

2) The pickup roller 211, the feed roller 221 and the separating roller 261 may be replaced by a rotatively driven belt member.

3) The present invention is not restricted to the above-described embodiments, but can also be applied to a sheet feeding device of the cassette type as in a copier.

4) The sheet feeding device of the present invention can be applied to a sheet treating device for separating and conveying a sheet and feeding it to a required treating portion, for example, a reading portion, a printing portion, a copying portion, an assorting portion, an applying portion, a heating portion, a cutting portion, a punching portion or a compound treating portion thereof.

5) The sheets include originals, cards, postcards, envelopes, bills, checks, share certificates, etc. Also, the material of the sheets is not limited to paper, but may be a plastic material, a metallic material, a wooden material, a ceramic material or the like.

6) While the embodiments are of an upward separating type in which stacked sheets (originals) are fed in succession from the uppermost one, use can also be made of a downward separating type in which stacked sheets are fed in succession from the lowermost sheet.

As described above, according to the present invention, in a sheet feeding device having a forwardly rotating conveying rotary member and a reversely rotating separating rotary member, and for separating and conveying sheets one by one by a sheet separating portion comprised of these two rotary members, an image reading apparatus and other sheet treating device provided with this sheet feeding device, it becomes possible to effect the setting of an appropriate center distance smoothly within a short time when a sheet is separated and conveyed with the center distance between the conveying rotary member and the separating rotary member fixed.

What is claimed is:

1. A sheet feeding device comprising:

a sheet separating portion for separating and conveying sheets one by one by a forwardly rotating conveying rotary member and a reversely rotating separating rotary member;

center distance changing means for relatively changing a center distance between said conveying rotary member and said separating rotary member;

control means for controlling said center distance changing means;

a displaying portion for displaying a set value of the center distance set by an operating portion; and selecting means for selecting between a first sheet feeding mode effecting sheet feeding while automatically adjusting the center distance by said center distance changing means and said control means for each sheet, and a second sheet feeding mode in which during sheet feeding operation, said control means effects sheet feeding with the center distance fixed at the set value displayed on said displaying portion, wherein in said second sheet feeding mode, an adjusting operation including feeding one sheet, automatically adjusting the center distance by said center distance changing means and said control means, and displaying an adjusted center distance on said displaying portion is performed so that a displayed center distance assumes the fixed center distance.

2. A sheet feeding device according to claim 1, wherein said selecting means comprises a first switch for arbitrarily selecting the first sheet feeding mode and the second sheet feeding mode, and a second switch for switching a propriety of a center distance setting input for effecting a setting of the center distance when the second sheet feeding mode is selected.

3. A sheet feeding device according to claim 1, further comprising input means for manually adjusting the center distance displayed by said adjusting operation, wherein in said second sheet feeding mode, the sheet is fed by the center distance adjusted by said input means.

4. A sheet feeding device according to claim 1, further comprising memory means for storing the set value of the center distance therein, wherein unless the set value of the center distance is changed, and when the second sheet feeding mode is selected, the second sheet feeding mode is executed at the set value of the center distance stored in said memory means.

5. An image reading apparatus comprising:

a separating portion for separating and conveying sheet-shaped originals one by one by a forwardly rotating conveying rotary member and a reversely rotating separating rotary member;

center distance changing means for relatively changing a center distance between the conveying rotary member and the separating rotary member;

control means for controlling the center distance changing means;

adjusting means for adjusting a brightness of a read image;

display means for displaying an adjusted value of the brightness of the read image;

a first switch for arbitrarily selecting between a first sheet feeding mode for effecting sheet feeding while automatically adjusting the center distance for each original, and a second sheet feeding mode for effecting sheet feeding with the center distance fixed; and a second switch for switching a propriety of a center distance setting input for effecting a setting of the center distance when the second sheet feeding mode is selected;

wherein when the center distance setting input is made possible by said second switch, the setting of the center distance is effected by said adjusting means for adjusting the brightness of the read image, and a set value of the center distance is displayed by said display means for displaying an adjusted value of the brightness of the read image.

6. An image reading apparatus according to claim 5, wherein an input for adjusting the set value of the center distance displayed by said display means is possible.

7. An image reading apparatus according to claim 5, further comprising memory means for storing the set value of the center distance therein, wherein unless the set value of the center distance is newly inputted, and when the second sheet feeding mode is selected, the second sheet feeding mode is executed at the set value of the center distance stored in the memory means.

8. A sheet feeding device comprising:

a sheet separating portion which forwardly rotates a first roller member and reversely rotates a second roller member to separate sheets one by one;

a center distance adjusting portion which automatically adjusting a center distance between said first roller member and said second roller member in accordance with a thickness of a sheet to be fed;

a selecting portion which selects between a first sheet feeding mode and a second sheet feeding mode; and a controlling portion which, in said first sheet feeding mode, feeds sheets while automatically adjusting the center distance by said center distance adjusting portion with respect to each of a plurality of sheets to be fed, and which, in said second sheet feeding mode, feeds sheets while automatically adjusting the center distance by said center distance adjusting portion with respect to one of a plurality of sheets to be fed, and while assuming an automatically adjusted center distance to be a fixed value with respect to the other sheets.

* * * * *

UNITED STATES PATENT AND TRADEMARK OFFICE
CERTIFICATE OF CORRECTION

PATENT NO. : 6,788,440 B1
DATED : September 7, 2004
INVENTOR(S) : Minoru Sashida It is certified that error appears in the above-identified patent and that said Letters Patent is hereby corrected as shown below:

Column 14,
Line 27, "adjusting" should read -- adjusts --.

Signed and Sealed this

Sixteenth Day of November, 2004

JON W. DUDAS
*Director of the United States Patent and Trademark Office*